INVENTOR.
KARL A. PAMER

United States Patent Office 3,428,195
Patented Feb. 18, 1969

3,428,195
STORAGE SYSTEM WITH MULTI-LEVEL LOAD HANDLING MEANS WITH A COMMON LOADING AND UNLOADING LEVEL
Karl A. Pamer, Chagrin Falls, Ohio, assignor to McNeil Corporation, a corporation of Ohio
Filed Apr. 25, 1967, Ser. No. 633,559
Claims priority, application Luxembourg, May 3, 1966, 51,022
U.S. Cl. 214—16.4             1 Claim
Int. Cl. E04h 6/00; B66c 17/00, 19/00

ABSTRACT OF THE DISCLOSURE

A warehousing system including a movable load transfer unit for storing and retrieving goods from storage areas, and vertical guide structure for permitting the elevator of the transfer unit to be lowered to a loading and unloading station below the level of the storage areas.

Background of the invention

This invention relates generally to material handling apparatus, and more specifically to material handling apparatus of the type used in automatic warehousing systems.

Warehousing systems including movable load transfer units adapted automatically to store and retrieve goods from storage areas, for example, shelves, bins or load-supports disposed in tiers, are known. The conventional systems have been designed to transfer goods between the storage areas and a loading and unloading station located on the same elevation as the storage areas.

Summary of the invention

The new warehousing system of this invention enables the elevator of a load transfer unit to be lowered to a loading and unloading station located on a level below the elevation of the storage areas which are serviced by the unit. A principal advantage of the invention is that each transfer unit of a warehousing system can be directly loaded and unloaded at the same level. Separate loading and unloading elevators or other means for transporting goods between a loading and unloading station and transfer units operating at higher elevations are not required.

The preferred embodiment of the invention may include one or more load transfer units which are movable on horizontal trackways that may be located on different levels. Each transfer unit may be of a conventional construction including a vertically reciprocal elevator and a load carrier or platform which is movable to opposite sides of the elevator so that the unit can selectively store and retrieve goods from tiers of shelves, bins or the like. A fixed vertical guide structure extends from a loading and unloading station in position to be aligned with the elevator of a transfer unit operating at a higher level. When the transfer unit is aligned with the fixed vertical guide structure, the elevator of the unit can be lowered on the guide structure to the loading and unloading station. In instances where a plurality of load transfer units are arranged for operation on different floors or elevations, all of the units can be loaded and unloaded at the same level.

Description of the preferred embodiment

Figure 1:
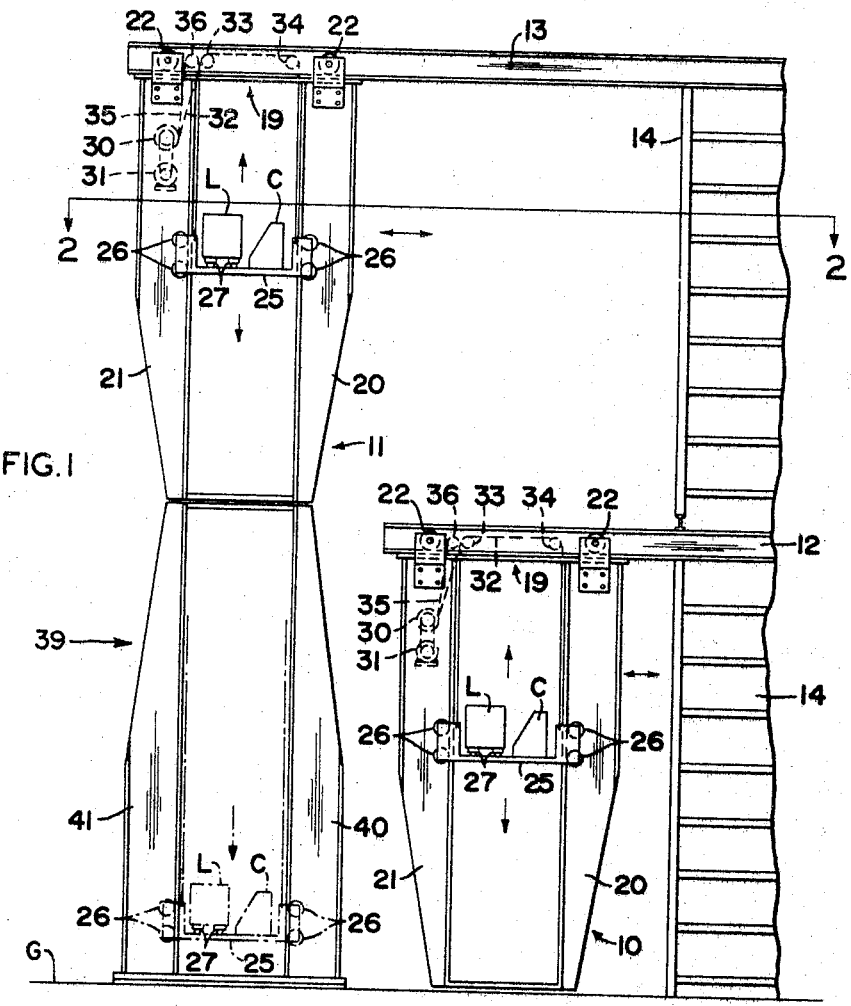
FIGURE 1 is a vertical elevational view of a multi-level warehousing system; and,
FIGURE 2 is a plan view taken generally on the line 2—2 of FIG. 1.
Figure 2:
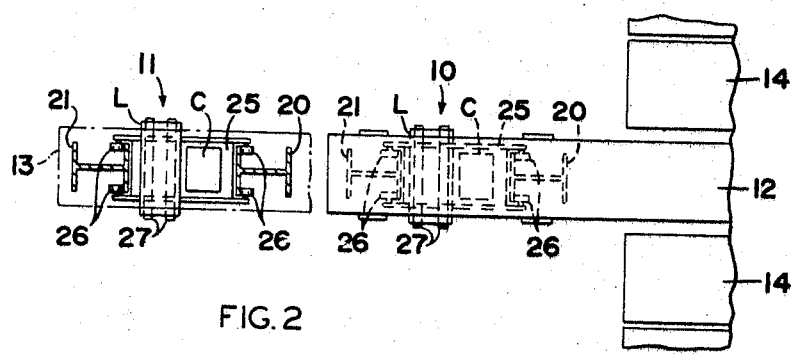

Referring now to the drawing, there is shown a portion of an automatic warehousing system including two load transfer units 10, 11 which operate at different levels or elevations. The load transfer units 10, 11 are movable along runways 12, 13, respectively, that extend between bays 14 of bins, shelves or palletized load-supports which are arranged in tiers.

The details of construction of the load transfer units 10, 11 do not form a part of the present invention, and various load transfer units suitable for use in an automatic warehousing system are well-known in the art. For purposes of describing the present invention, each unit has been schematically shown as comprising a trolley or carrier 19 which includes a vertical mast formed by a pair of spaced, vertical I-beams 20, 21. The carrier or trolley 19 of each transfer unit 10, 11 is provided with sets of wheels 22 which run on the lower flanges of the rails that form the runways 12, 13, respectively.

In each unit an elevator 25 is guided for vertical movement on the mast formed by the beams 20, 21. As shown, the elevator 25 includes sets of rollers 26 which engage flanges of the beams 20, 21 to guide the elevator 25 in its vertical travel. As is conventional, the elevator 25 also includes a load carrier or platform 27 which is movable to project from opposite sides of the elevator in order to pick up and/or deposit loads L. A cable lift system or other suitable means is provided for raising and lowering the elevator 27 on the mast structure formed by the beams 20, 21. The cable lift system for each unit is shown as including a cable drum 30 on the trolley 19 which is driven by a motor 31. A cable 32 extends from the drum 30 over a pair of sheaves 33, 34 mounted near the top of the trolley 19 and is connected to one end of the elevator 25. Another cable 35 has one end connected to the drum 30 and extends over a sheave 36 to the opposite end of the elevator 25.

Each load transfer unit 10, 11 is driven along its runway by a suitable motor (not shown) between the bays 14 of shelves, bins or the like. The elevator 25 is vertically movable on the mast structure defined by the beams 20, 21 to align the load carrier or platform 27 with a selected shelf or bin at either side of the unit. The load platform or carrier 27 is then actuated to either side of the unit in order to deposit and/or remove a load L from the selected bin or shelf. If desired, the movements of each transfer unit 10, 11 may be controlled from an operator's console C on the elevator 25. Alternately, the operations of the load transfer units 10, 11 can be fully automatic and the controls located at the loading and unloading stations of the elevators.

In accordance with the present invention, a fixed vertical guide structure 39 is disposed below the path of travel of the upper load transfer unit 11. The guide structure 39 extends upwardly from a loading and unloading station at ground level G to a height adjacent the lower end of the upper unit 11. As shown, the fixed guide structure 39 is comprised of spaced I-beams 40, 41 which are arranged to form a continuation of the mast beams 20, 21 when the unit 11 is positioned overhead.

When it is desired to load and/or unload the upper unit 11, the unit is moved along its runway 13 until the beams 20, 21 are aligned with the beams 40, 41 of the fixed guide structure 39. In this position, the elevator 25 of the unit 11 can be lowered to the illustrated, broken line position for loading and/or unloading at ground level.

As will be apparent from the foregoing description, the invention enables the elevator of a load transfer unit operating at an upper level to be loaded and/or unloaded at a lower level. A separate elevator or other means for transporting loads to and from the upper unit is not required. In the case of a multi-level warehousing system including a plurality of load-transfer units operating at different elevations, the invention permits each unit to be directly loaded and/or unloaded at the same level, for example, at ground level G. A conveyor system operating on the level of the loading and unloading station can be provided to move loads to and from the elevators of all of the transfer units.

What is claimed is:

1. In a multi-level warehousing system including bays of load-supporting means at different levels, said load-supporting means at each level being arranged in tiers, a first horizontal runway extending between said bays of load-supporting means on one level, a first load transfer unit movable along said first runway, said first unit including vertical mast structure and load elevating means vertically movable along said mast structure to a loading and unloading station on said one level, a second horizontal runway extending between said bays of load-supporting means on another level above said first runway and vertically aligned therewith, a second load transfer unit movable along said second runway, said second unit including vertical mast structure having a lower end terminating short of said first runway and load elevating means vertically movable on said mast structure, fixed vertical guide structure disposed below said second runway and extending upwardly from said loading and unloading station on said one level, said guide structure being constructed to form a continuation of the mast structure of said second unit when said second unit is positioned overhead, and said elevating means of said second unit being vertically movable on the aligned guide and mast structures, whereby said second unit can be loaded and unloaded on the same level as first unit.

References Cited

UNITED STATES PATENTS

| 2,948,421 | 8/1960 | Smith et al. | 214—16.1 |
|---|---|---|---|
| 1,369,393 | 2/1921 | Burgess | 214—16.4 |
| 2,951,599 | 9/1960 | Bogar | 214—16.1 |
| 1,828,308 | 10/1931 | Been | 214—16.1 |
| 3,033,392 | 5/1962 | Baumann et al. | 214—16.4 |

FOREIGN PATENTS 416,781   9/1934   Great Britain.

GERALD M. FORLENZA, *Primary Examiner.*

R. B. JOHNSON, *Assistant Examiner.*

U.S. Cl. X.R.

212—18, 128